(12) United States Patent
Yu et al.

(10) Patent No.: US 9,948,375 B2
(45) Date of Patent: Apr. 17, 2018

(54) METHOD AND APPARATUS FOR TRANSMITTING AND RECEIVING REFERENCE SIGNAL THROUGH BEAM GROUPING IN WIRELESS COMMUNICATION SYSTEM

(71) Applicant: Samsung Electronics Co., Ltd., Suwon-si, Gyeonggi-do (KR)

(72) Inventors: Hyun-Kyu Yu, Suwon-si (KR); Jeong-Ho Park, Seoul (KR); Su-Ryong Jeong, Yongin-si (KR); Cheol Jeong, Seoul (KR); Noh-Gyoung Kang, Seoul (KR); Jae-Won Kim, Gimpo-si (KR); Kang-Jin Yoon, Seoul (KR); Jae-Eun Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/910,154

(22) PCT Filed: Aug. 5, 2014

(86) PCT No.: PCT/KR2014/007232
§ 371 (c)(1),
(2) Date: Feb. 4, 2016

(87) PCT Pub. No.: WO2015/020404
PCT Pub. Date: Feb. 12, 2015

(65) Prior Publication Data
US 2016/0197659 A1 Jul. 7, 2016

Related U.S. Application Data

(60) Provisional application No. 61/975,325, filed on Apr. 4, 2014.

(30) Foreign Application Priority Data

Aug. 5, 2013 (KR) .................. 10-2013-0092390

(51) Int. Cl.
*H04B 7/06* (2006.01)
*H04W 16/28* (2009.01)
(Continued)

(52) U.S. Cl.
CPC ............ *H04B 7/0617* (2013.01); *H04B 1/62* (2013.01); *H04B 7/0408* (2013.01);
(Continued)

(58) Field of Classification Search
None
See application file for complete search history.

(56) References Cited

U.S. PATENT DOCUMENTS

2007/0285312 A1  12/2007  Gao et al.
2008/0227495 A1   9/2008  Kotecha et al.
(Continued)

FOREIGN PATENT DOCUMENTS

KR  10-2010-0009463 A  1/2010
KR  10-2010-0044258 A  4/2010
(Continued)

*Primary Examiner* — Diane Lo
(74) *Attorney, Agent, or Firm* — Jefferson IP Law, LLP

(57) ABSTRACT

A method for transmitting a reference signal by a base station in a wireless communication system is provided. The method includes transmitting configuration information for a reference signal to a terminal, performing a scrambling operation which multiplies the reference signal by a sequence on the basis of a beam group identifier for each of at least two beam groups set on a single cell, and transmitting the reference signal, to which the scrambling operation has been performed on the basis of the configuration information, to the terminal.

20 Claims, 10 Drawing Sheets

(51) Int. Cl.
  *H04B 1/62*   (2006.01)
  *H04B 7/0408* (2017.01)
  *H04J 3/16*   (2006.01)
  *H04J 13/00*  (2011.01)

(52) U.S. Cl.
  CPC ........ *H04J 3/1694* (2013.01); *H04J 13/0003* (2013.01); *H04W 16/28* (2013.01)

(56) References Cited

U.S. PATENT DOCUMENTS

| | | | |
|---|---|---|---|
| 2009/0046800 A1 | 2/2009 | Xu et al. | |
| 2010/0027454 A1* | 2/2010 | Hou | H04B 7/024 370/312 |
| 2010/0272218 A1* | 10/2010 | Yeh | H04B 7/024 375/330 |
| 2011/0116572 A1 | 5/2011 | Lee et al. | |
| 2012/0329498 A1* | 12/2012 | Koo | H04J 11/005 455/501 |
| 2013/0044722 A1 | 2/2013 | Kang et al. | |
| 2013/0258894 A1* | 10/2013 | Ogawa | H04L 5/0023 370/252 |
| 2014/0211731 A1 | 7/2014 | Inoue et al. | |

FOREIGN PATENT DOCUMENTS

| | | |
|---|---|---|
| WO | 2011/136578 A2 | 11/2011 |
| WO | 2013/024852 A1 | 2/2013 |

\* cited by examiner

METHOD AND APPARATUS FOR TRANSMITTING AND RECEIVING REFERENCE SIGNAL THROUGH BEAM GROUPING IN WIRELESS COMMUNICATION SYSTEM

CROSS-REFERENCE TO RELATED APPLICATION(S)

This application is a U.S. National Stage application under 35 U.S.C. § 371 of an International application filed on Aug. 5, 2014 and assigned application number PCT/KR2014/007232, which claimed the benefit of a Korean patent application filed on Aug. 5, 2013 in the Korean Intellectual Property Office and assigned Serial number 10-2013-0092390, and of a U.S. Provisional application filed on Apr. 4, 2014 in the U.S. Patent and Trademark Office and assigned Ser. No. 61/975,325, the entire disclosure of each of which is hereby incorporated by reference.

TECHNICAL FIELD

The present disclosure relates to a wireless communication system. More particularly, the present disclosure relates to a method and an apparatus for transmitting and receiving a reference signal through beam grouping in a communication system supporting beamforming.

BACKGROUND

In order to meet traffic demands of wireless data which is continuously increasing, the wireless communication system has been developed in a direction for supporting higher data transmission rates. A 4th generation (4G) wireless communication system sought to develop a technology that mainly improves a spectral efficiency to increase the data transmission rate. However, it is difficult to satisfy heavily increasing wireless data traffic demands only with a frequency efficiency improving technology.

Accordingly, research on the use of a very wide frequency band is actively being processed at present. In general, a frequency band currently used for a mobile communication cellular system is equal to or smaller than 10 GHz. Now, it is very difficult to secure a wider frequency band and, accordingly, it is required to secure a broadband frequency in a higher frequency band. However, as the frequency band for wireless communication is higher, a propagation path loss increases and thus a propagation arrival distance becomes relatively short and service coverage becomes reduced. Accordingly, a beamforming technology is currently raised as one of the main technologies to mitigate the propagation path loss and increase the propagation arrival distance.

The beam forming may be classified into transmission beamforming performed at a transmitting end and reception beamforming performed at a receiving end. In general, the transmission beamforming increases directivity by concentrating a radio wave arrival area in a particular direction through a plurality of antennas. At this time, the form in which the plurality of antennas are arranged may be referred to as an antenna array, and each antenna included in the array may be referred to as an array element. The antenna array may be configured in various types, such as a linear array and a planar array. Further, when the transmission beamforming is used, the signal directivity increases and thus a signal transmission distance also increases. In addition, since the signal is hardly transmitted in another direction other than the directed direction, the receiving end gives significantly reduced signal interference to another receiving end.

The receiving end may perform the beamforming on received signals through a reception antenna array. The reception beamforming concentrates reception of radio waves in a particular direction to increase received signal sensitivity incident from the corresponding direction and excludes signals incident from directions other than the corresponding direction from the received signals, so as to provide a gain of blocking an interference signal.

As described above, in order to secure the wide frequency band, an ultra-high frequency, that is, a millimeter wave system is expected to be introduced, in which case the beamforming technology is being considered to overcome the propagation path loss.

However, in the beamforming technology, a base station has to transmit a reference signal in all transmission-available beam directions one or more times and a user equipment has to receive the reference signal in all reception-available beam directions, so that a reference signal transmission efficiency is reduced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting/receiving a reference signal through beam grouping in a wireless communication system.

Another aspect of the present disclosure is to provide a method and an apparatus for transmitting/receiving a reference signal through beam grouping, which increases a reference signal transmission efficiency in a wireless communication system.

In accordance with an aspect of the present disclosure, a method of transmitting a reference signal in a wireless communication system by a base station (BS) is provided. The method includes transmitting configuration information on reference signals to a user equipment (UE), performing a scrambling operation of multiplying the reference signal and a sequence based on a beam group identifier of each of two or more beam groups configured in one cell, and transmitting the reference signals having passed through the scrambling operation to the UE based on the configuration information.

In accordance with another aspect of the present disclosure, a method of receiving a reference signal in a wireless communication system by a UE is provided. The method includes receiving a reference signal transmitted after performance of a scrambling operation of multiplying a sequence based on a beam group identifier for each of two or more beam groups set in one cell from a BS, performing a descrambling operation on the received reference signal, measuring a beam group identifier and a beam identifier, which meet a particular condition, based on a result of the descrambling operation with respect to each of the two or more beam groups, and transmitting information related to the measured beam group identifier and beam identifier.

In accordance with another aspect of the present disclosure, a BS for transmitting reference signals in a wireless communication system is provided. The BS includes a controller that performs a scrambling operation of multiplying the reference signal and a sequence based on a beam group identifier of each of two or more beam groups configured in one cell, and a transmitter that transmits configuration information on the reference signals to a UE and transmits the reference signals having passed through the scrambling operation to the UE based on the configuration information.

In accordance with another aspect of the present disclosure, a UE for receiving a reference signal in a wireless communication system is provided. The UE includes a receiver that receives a reference signal transmitted after performance of a scrambling operation of multiplying a sequence based on a beam group identifier for each of two or more beam groups set in one cell from a BS, performing a descrambling operation on the received reference signal, a controller that measures a beam group identifier and a beam identifier, which meet a particular condition, based on a result of the descrambling operation with respect to each of the two or more beam groups, and a transmitter that transmits information related to the measured beam group identifier and beam identifier.

An embodiment of the present disclosure has an effect of transmitting/receiving a reference signal through beam grouping in a wireless communication system.

Further, an embodiment of the present disclosure has an effect of transmitting/receiving a reference signal through beam grouping, which increases a reference signal transmission efficiency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
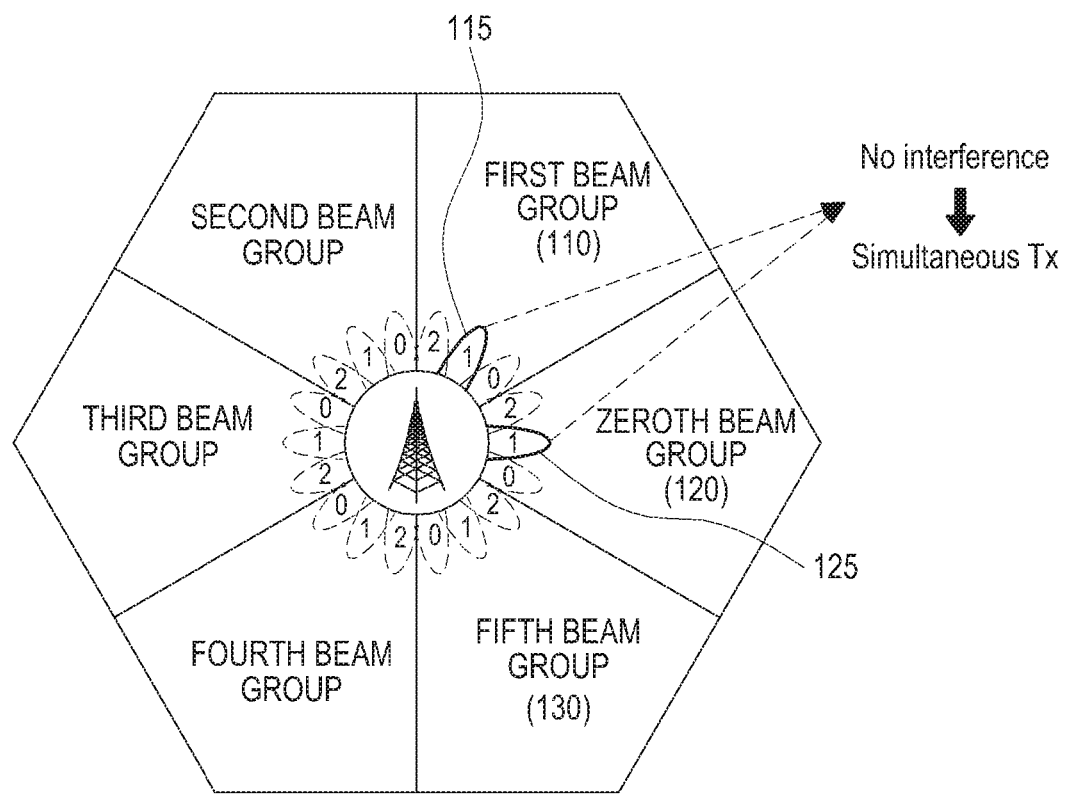
FIG. 1 illustrates an example of beam grouping according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described below are based on an assumption that a reference signal (RS) for channel measurement of a user equipment (UE) is periodically transmitted in a downlink. The channel measurement basically refers to measurement of a channel quality indicator (CQI), precoding matrix indicator (PMI), a rank indicator (RI), and the like, and also measurement of a beam identifier (ID) for a beam that secures an optimal channel environment among all transmission-available beams and an antenna ID for an antenna that secures an optimal channel environment.

In the present disclosure, the RS includes, for example, a mid-amble, a channel state indicator (CSI)-RS, and the like, used in a 4th generation (4G) cellular communication system. Further, with respect to a plurality of beams supported by a base station (BS), the reference signals are transmitted while being separated through a time division multiplexing (TDM) scheme, a frequency division multiplexing (FDM) scheme, or a code division multiplexing (CDM) scheme.

Similar to the cellular system, in the beamforming system, a transmission frequency efficiency of a user located on a cell boundary further deteriorates compared to a cell center. Accordingly, in order to improve such deterioration, an interference control scheme through inter-cell cooperation may be considered.

Further, unlike the cellular system, in the beamforming system, an interference signal of another cell received in the same site is dominant rather than an interference signal of the other cell received in a different site. This is because the UE performs reception beamforming and is significantly affected by the interference signal received from the side lobe of another beam in the same site. The other cell in the same site may be considered as another sector within the same site.

Accordingly, in order to increase performance of a cell boundary region in the beamforming system, using an inter-beam interference control scheme in the same site is more efficient due to high performance compared to its complexity.

A scheme for removing inter-beam interference within the same site includes a scheme of deploying one site as one cell. However, in this case, if it is assumed that the BS transmits the reference signal, the BS preferably transmits reference signals for all transmission beams through a TDM scheme, an FDM scheme, or a CDM scheme, thereby greatly increasing overhead of the reference signals.

Another scheme for removing the inter-beam interference within the same site is to divide one site into three or six cells (or sectors) and minimize the inter-beam interference through cooperation between cells included in the same site. However, in this case, even when the UE moves within the same site, overhead is generated since a handover process is preferably performed.

Accordingly, embodiments of the present disclosure describe a scheme for removing inter-beam interference within the same site without overhead due to the RS and the handover.

FIG. 1 illustrates an example of beam grouping according to an embodiment of the present disclosure.

Referring to FIG. 1, a scenario in which one cell is deployed in one site is assumed. With respect to a plurality of beams supported by the cell, the BS groups beams within 60 degrees as one group to configure six beam groups, that is, a $0^{th}$ beam group 120 to a fifth beam group 130. As an example, a plurality of beams supported by the cell are grouped as six beam groups, but the number of cells configured by the group is not limited thereto.

Further, it is assumed that interference between $k^{th}$ beams included in the groups is hardly generated. That is, interference between a first beam 125 included in the $0^{th}$ beam group 120 and a first beam' 115 included in a first beam group 110 is not generated (no interference). Accordingly, the BS simultaneously transmits the RS for the first beam 125 and the RS for the first beam' 115 (simultaneous transmission (Tx)). At this time, the BS separates the reference signals through a space division multiplexing (SDM) scheme. The reason why the reference signals may be separated through the SDM scheme is that $k^{th}$ beams included in the beam groups do not generate interference therebetween as described above.

However, when the UE measures a channel state and reports the measured channel state to the BS, the UE preferably identifies a beam group including the corresponding beam, so that the BS performs scrambling of multiplying the RS by a sequence based on a beam group ID for identifying the beam group and transmits the scrambled reference signals to the UE. According to another example, the BS may perform interleaving or masking on the RS and transmit the reference signal. Further, in order to minimize overhead for adjacent BS scanning, the BS may restrictively apply scrambling only to a particular time/frequency resource, a particular antenna, or a particular beam.

Accordingly, a method of transmitting the RS through beam grouping according to an embodiment of the present disclosure does not generate overhead for the RS and the handover and increases a transmission frequency efficiency of the user located at a cell boundary.

Figure 2:
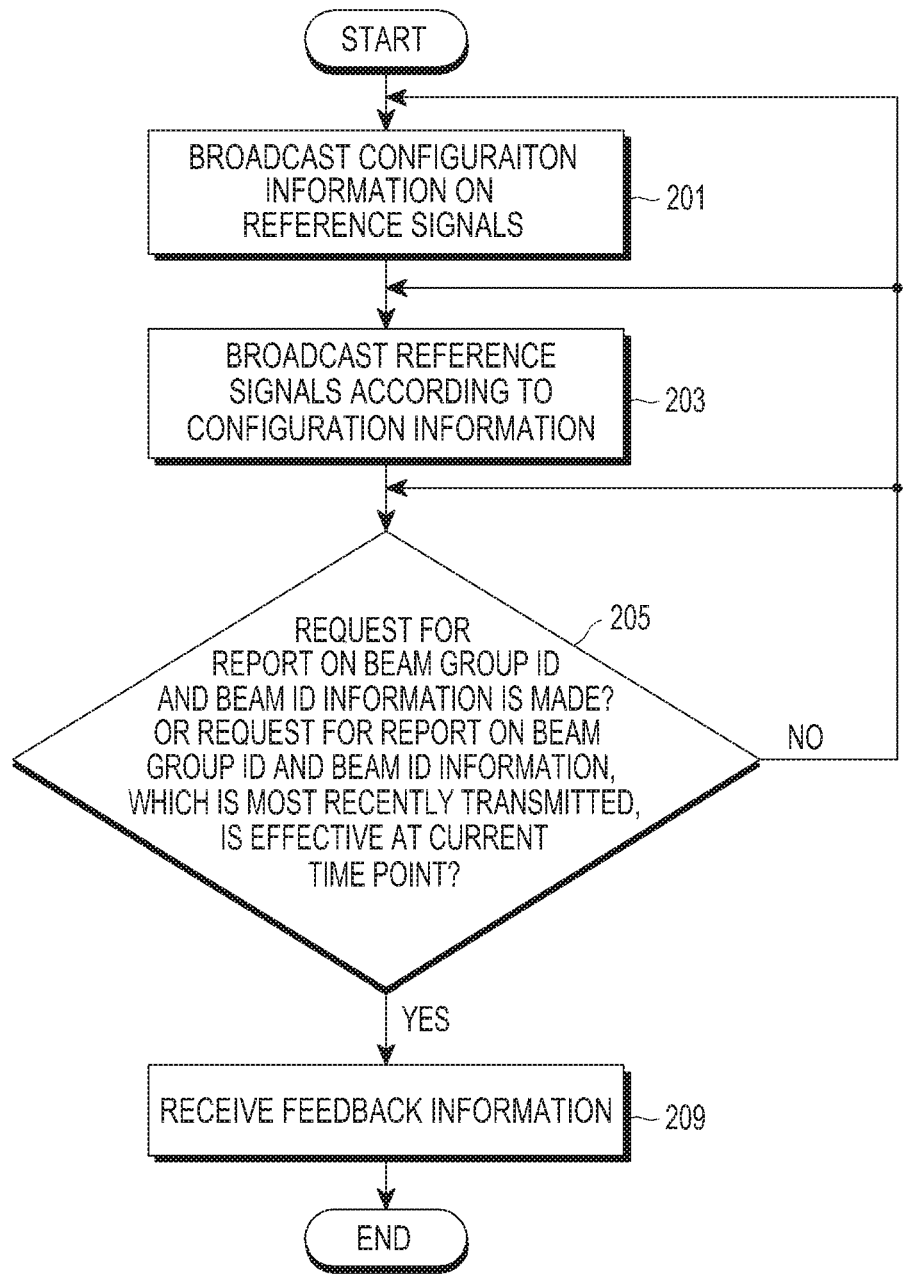
FIG. 2 is a flowchart illustrating an example of an operation in which a base station (BS) transmits reference signals and receives feedback information based on beam grouping according to an embodiment of the present disclosure.

FIG. 2 is a flowchart illustrating an example of an operation in which a BS transmits an RS and receives feedback information based on beam grouping according to an embodiment of the present disclosure.

Referring to FIG. 2, it is assumed that a plurality of beam groups are formed in such a manner that beams within a predetermined angle among a plurality of beams supported by a particular cell are grouped as one group and each of the formed beam groups is identified by a beam group ID.

In operation 201, the BS broadcasts configuration information on the RS to UEs and proceeds to operation 203. The configuration information is transmitted through a signal, which transfers system information such as a system information block (SIB), a master information block (MIB), and the like. Further, the configuration information includes at least one piece of information related to the number of antennas included in the antenna array, information related to the number of transmission beams included in the beam group, information related to the number of beam groups set in one cell, and information related to a time, frequency, or code resource location used for transmission of the reference signal.

In operation 203, the BS broadcasts reference signals to the UEs according to the configuration information and proceeds to operation 205. The RS may be transmitted in a pre-appointed scheme according to predetermined configuration information, and the predetermined configuration information will be described in more detail with reference to FIG. 3 below.

A transmission period of the configuration information may be longer than a transmission period of the reference signal, and the RS is transmitted after the performance of the scrambling of multiplying the RS by the sequence based on the beam group ID. That is, in order to distinguish between the beam groups, the BS scrambles the reference signals based on the beam group ID and then transmits the reference signals and, at this time, the number of sequences used for the scrambling is determined according to the number of beam groups. It has been described as an example that the RS is scrambled based on the beam group ID and then transmitted, but the RS may be interleaved or masked and then transmitted according to cases.

In operation 205, the BS identifies whether the BS makes a request for a report on a beam group ID and beam ID information to a particular UE among the UEs, to which the RS are transmitted, or whether the request for the report on the beam group ID and beam ID information, which is most recently transmitted to the UE, is effective at a current time point. The beam group ID and the beam ID information refer to a beam group ID and beam ID information with respect to a beam that meets a particular condition. The particular condition may be a condition that, for example, guarantees an optimal channel environment.

When the BS has made a request for the report on the beam group ID and beam ID information or the request for the report on the beam group ID and beam ID information, which is most recently transmitted to the UE, is effective at a current time point, the BS receives feedback information from the particular UE in operation 209. The feedback information refers to channel measurement information, and the channel measurement information will be described in the UE operation of FIGS. 4 and 6 described below in more detail.

However, when the BS has not made the request for the report on the beam group ID and beam ID information to the particular UE or the request for the report on the beam group ID and beam ID information, which is most recently transmitted to the UE, is not effective at a current time point, based on a result of the identification of operation 205, the BS proceeds to one of operations 201, 203, and 205. That is, the BS proceeds to one of operations 201, 203, and 205 according to an RS configuration information broadcasting period and an RS broadcasting period. The operation of identifying whether the request for the report on the beam group ID and beam ID information, which is most recently transmitted to the UE, is effective at a current time point in operation 205 is applied only when the BS also transmits time information indicating an effective time of the request for the report when making the request for the report on the beam group ID and beam ID information to the UE. Further, in this case, when the request for the report on the beam group ID and beam ID information, which is most recently transmitted to the UE, is effective at a current time point, the BS receives feedback information from the UE in operation 209 and repeatedly performs operations 201 to 209 until the time information reaches a designated time.

Figure 3:
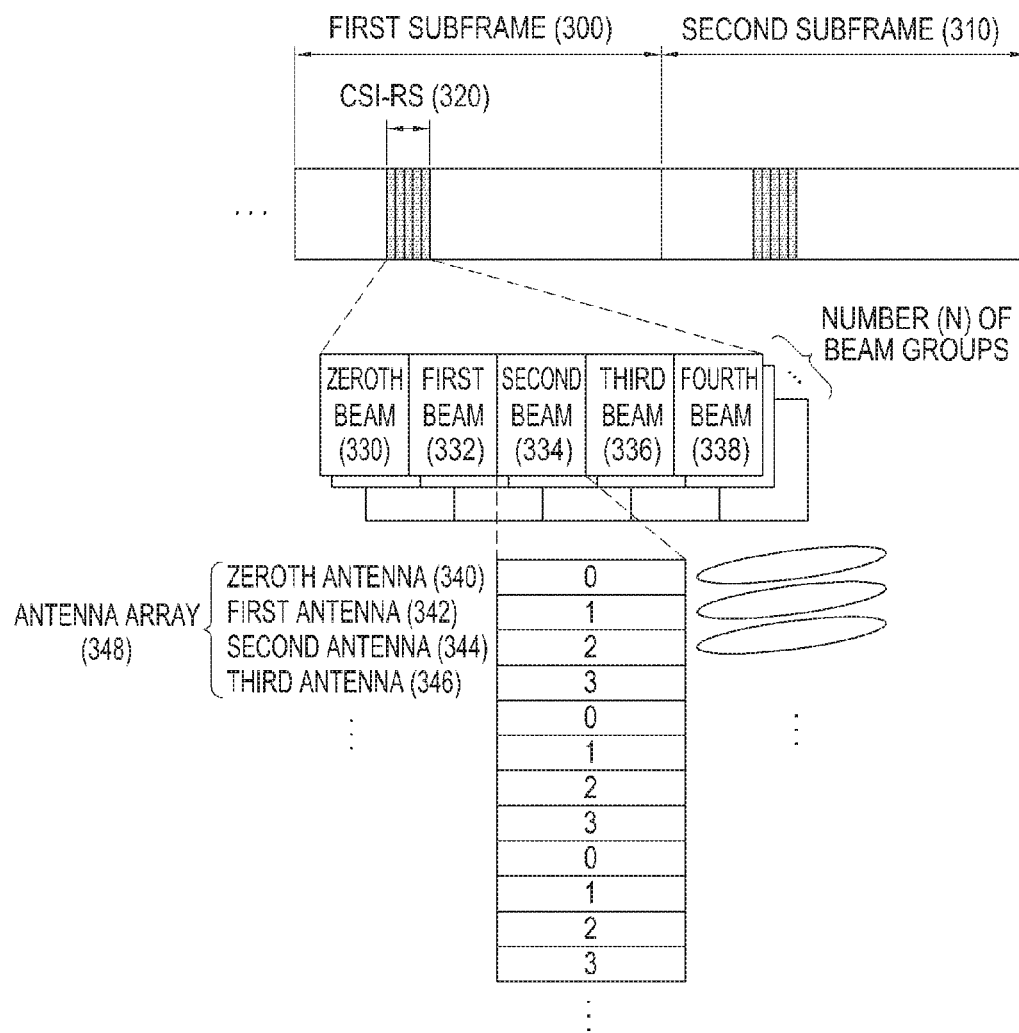
FIG. 3 illustrates an example of a frame structure in which reference signals are transmitted according to an embodiment of the present disclosure.

FIG. 3 illustrates an example of a frame structure in which an RS is transmitted according to an embodiment of the present disclosure.

Referring to FIG. 3, the reference signal, for example, a CSI-RS 320 is transmitted in each of a first subframe 300 and a second subframe 310. It is assumed that an antenna array 348 includes four antennas and each antenna transmits five beams. That is, the antenna array 348 includes zeroth to third antennas 340, 342, 344 and 346 and each antenna transmits zeroth to fourth beams 330, 332, 334, 336 and 338.

The CSI-RS 320 is transmitted through the zeroth beam 330 to the fourth beam 338, and the zeroth beam 330 to the fourth beam 338 are divided by time resources. Accordingly, reference signals transmitted through the zeroth beam 330 to the fourth beam 338 do not generate interference therebetween.

Further, the zeroth antenna 340 to the third antenna 346 transmit reference signals through corresponding beams, respectively, and are divided by frequency resources. Accordingly, reference signals transmitted through the zeroth beam 330 to the fourth beam 348 do not generate interference therebetween.

The CSI-RS 320 is transmitted through the zeroth beam 330 to the fourth beam 338 of beam groups in accordance with the number (N) of beam groups and, particularly, the CSI-RS 320 is scrambled by N sequences determined according to the number of beam groups and then transmitted. The beam groups are divided by spatial resources. Accordingly, an RS transmitted through the second beam 334 of a first beam group and the RS transmitted through the second beam of an $N^{th}$ beam group do not generate interference therebetween. Further, in order to minimize overhead for adjacent BS scanning, the BS may restrictively apply the scrambling only to predetermined particular time/ frequency resources, particular antenna, or particular beam.

As described above, since orthogonal resources are allocated to the beams, antennas, and beam groups, the reference signals transmitted through beams, the RS transmitted through the antennas, and the reference signals transmitted through the beam groups do not generate interference therebetween.

Figure 4:
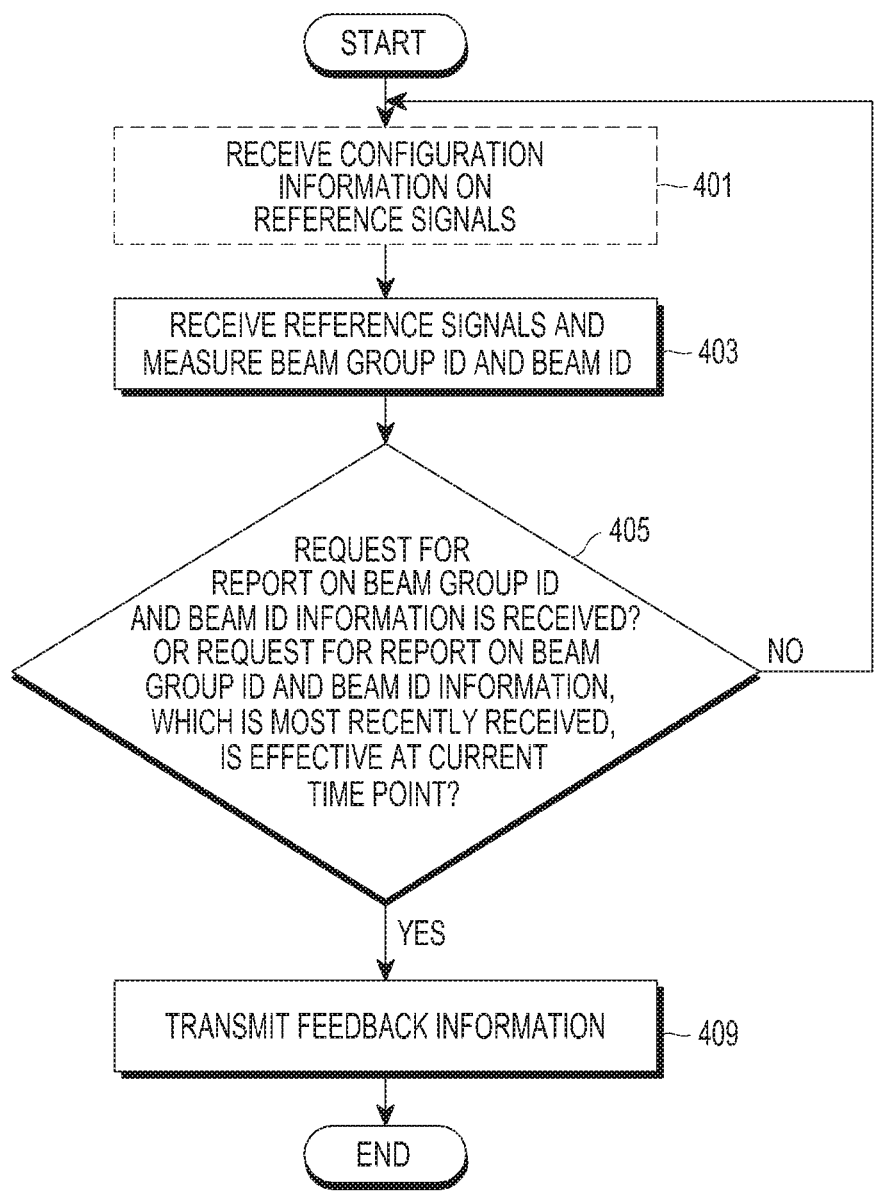
FIG. 4 is a flowchart illustrating an example of an operation in which a user equipment (UE) receives a reference signal transmitted based on beam grouping and transmits feedback information according to an embodiment of the present disclosure.

FIG. 4 is a flowchart illustrating an example of an operation in which a UE receives an RS transmitted based on beam grouping and transmits feedback information according to an embodiment of the present disclosure.

Referring to FIG. 4, it is assumed that a plurality of beam groups are formed in such a manner that beams within a predetermined angle among a plurality of beams supported by a particular cell are grouped as one group and each of the formed beam groups is identified by a beam group ID.

The UE receives configuration information on the RS through a signal transferring system information transmitted from the BS in operation 401, and proceeds to operation 403. Operation 401 may be performed only when the UE does not know the configuration information on the RS or when the configuration information is changed by the BS, and may be omitted when the UE already knows the configuration information on the reference signal.

The UE receives the RS from the BS in operation 403, and proceeds to operation 405 after measuring a beam group ID and a beam ID that meet a particular condition by using the received reference signal. The particular condition may be a condition that, for example, guarantees an optimal channel environment.

Since the BS preferably measures the beam group ID, which guarantees the optimal channel environment, at the same time when measuring the beam ID, which guarantees the optimal channel environment, in operation 403, the BS basically performs descrambling on the scrambled reference signals based on all beam group IDs. Of course, when the RS is scrambled together with information such as a cell ID and a frame index, the descrambling is performed in consideration of the information on the cell ID and the frame index.

In order to reduce calculation complexity generated by the descrambling of the RS based on all beam group IDs in the beam ID measurement, the UE may measure the beam group IDs through the following method. That is, the UE measures beam group IDs and selects a preferred beam group ID according to the following cases and, when selecting a preferred beam group ID according to another case, performs the descrambling only on the scrambled RS based on the previously selected beam group ID. The preferred beam group ID refers to a beam group ID selected by the UE according to a reference such as a signal intensity or a signal to noise ratio. In embodiments of the present disclosure described below, the preferred beam and the aforementioned beam, which guarantees the optimal channel environment, will be used as the same meaning.

(1) Measure a beam group ID according to a measurement period longer than a beam ID measurement period (2) Measure a beam ID only when a value indicating a change in a signal intensity or a signal to noise interference ratio for a currently preferred beam group ID is larger than a particular threshold Since it is enough to measure only the already selected preferred beam group ID or a beam group ID and a beam ID indicated by the BS in the CSI measurement, the UE performs the descrambling only on the scrambled RS, based on the corresponding beam group ID.

In operation 405, the UE identifies whether the UE receives a request for a report on the beam group ID and beam ID information from the BS or whether the request for the report on the beam group ID and beam ID information, which is most recently received from the BS, is effective at a current time point. The beam group ID and beam ID information refer to a beam group ID and beam ID information with respect to a beam, which guarantees the optimal channel environment.

When the UE has received the request for the report on the beam group ID and beam ID information or the request for the report on the beam group ID and beam ID information, which is most recently received from the BS, is effective at the current time point, the UE transmits feedback information to the BS in operation 409. That is, the UE which has measured the channel feeds back channel measurement information, for example, information such as a preferred beam group ID, a beam ID, or an antenna ID according to a request from the BS.

However, when the UE has not received the request for the report on the beam group ID and beam ID information or the request for the report on the beam group ID and beam ID information, which is most recently received from the BS, is not effective at the current time point, based on a result of the identification of operation 405, the UE proceeds to operation 401.

The information fed back through operation 409 will be described below in more detail.

According to a first embodiment, the UE may feed back M (M=1, 2, . . . ) preferred beam (or preference beam) IDs per antenna and the beam group IDs of the preferred beams to the BS. For example, when M=1 and the number of antennas (or array antennas) is two, the UE feeds back the following information to the BS. That is, with respect to the zeroth antenna and the first antenna, the UE feeds back the preferred beam ID and the beam group ID of the preferred beam to the BS in the form of the antenna ID, the beam group ID and the beam ID. The antenna ID, the beam group ID, and the beam ID may be (0, 1, 2) and (1, 3, 1).

The number of preferred beams transmitted per antenna is not limited to M, and the number of pieces of fed back information may be limited to P. For example, when P=3 and the number of antennas (or array antennas) is two, the UE feeds back the following information to the BS. That is, with respect to each of the zeroth antenna and the first antenna, the UE feeds back the preferred beam ID and the beam group ID of the preferred beam to the BS in the form of the antenna ID, the beam group ID, and the beam ID. At this time, the fed back information may be, for example, the antenna ID, the beam group ID, and the beam ID (0, 1, 2), (1, 3, 1), and (0, 1, 4).

In both cases, only when one of the antenna ID, the beam group ID, and the beam ID is changed, the UE may report the antenna ID, the beam group ID, and the beam ID to the BS or may periodically report the antenna ID, the beam group ID, and the beam ID to the BS. When the antenna ID, the beam group ID, and the beam ID are periodically reported, report periods of the antenna ID, the beam group ID, and the beam ID may be different from each other. Further, the report period of the beam group ID may be longer than the report period of the beam ID.

According to a second embodiment, when feeding back N (N=1, 2, . . . ) preferred beam IDs to the BS, the UE may feed back only a beam group ID of a reference beam ID selected from the N preferred beam IDs. At this time, the UE does not feed back the other preferred beam ID except for the reference beam ID, and feed back only a value ($\delta$) indicating a difference value between the reference beam ID and the preferred beam ID.

For example, when it is assumed that N, which indicates the number of preferred beams, is 2 and each beam group includes 8 beams, if the beam group ID and the beam ID, which are selected by the UE, correspond to the beam group ID, and beam ID=(0, 5) and (1, 2), the UE feeds back 5 as the reference beam ID and feeds back 0 as the beam group ID of the reference beam ID. Further, the UE feeds back 5 as the difference value ($\delta$) between the reference beam ID (5) and the preferred beam ID (2). The difference value 5 is calculated by (1×8+2)−(0×8+5).

Although an example in which the beam ID having the beam group ID of 0 is selected as the beam ID has been described herein, the reference beam ID may be selected in various ways according to a reference configured in the system. Further, an embodiment of the present disclosure considers a case where each beam group includes the same number of beams and beams having the same beam ID included in different beam group IDs are spatially sufficiently separated from each other, interference is hardly generated between the beams having the same beam ID included in the different beam group IDs. Accordingly, a range of the difference value $\delta$ between the reference beam ID and the preferred beam ID may be limited to the number of beams included in the beam group. That is, when it is assumed that the beam group includes 8 beams, the range of $\delta$ may be expressed as $1 \leq \delta \leq 8$.

According to a third embodiment, the UE feeds back the reference beam ID and the beam group ID of the reference beam ID to the BS according to a predetermined period, and feeds back only the preferred beam ID according to a period shorter than the predetermined period. For example, the UE feeds back the reference beam ID and the beam group ID of the reference beam ID to the BS according to a period of 100 ms and feeds back only the preferred beam ID according to a period of 20 ms.

Further, when feeding back the preferred beam ID according to the period of 20 ms, the UE feeds back only $\delta$ indicating the difference value between the reference beam ID and the preferred beam ID like in the second embodiment described above. Accordingly, for efficiency of transmission of $\delta$, when reporting the reference beam ID, the UE may select, as the reference beam ID, a beam ID having the smallest value of a combination of the beam group ID and the beam ID in indexes among beams having signal intensities larger than a particular threshold.

The operation of identifying whether the request for the report on the beam group ID and beam ID information, which is most recently received from the BS, is effective at the current time point in operation 405 is applied only when the UE also receives time information indicating an effective time of the request for the report when receiving the request for the report on the beam group ID and beam ID information from the BS. Further, in this case, when the request for the report on the beam group ID and beam ID information, which is most recently received from the BS, is effective at the current time point, the UE transmits feedback information in operation 409 and repeatedly performs operations 401, 403, 405 and 409 until the time information reaches an indicated time.

An embodiment of the present disclosure has described, as an example, the operation in which the BS groups $k^{th}$ beams included in respective beam groups to be separated from each other through an SDM scheme and transmits reference signals based on such beam grouping, wherein each beam group includes the same number of beams.

An embodiment of the present disclosure below will describe a grouping method, which may be applied when each beam includes the same number of beams and it is difficult to group the $k^{th}$ beams included in the respective beam groups to be separated from each other in the SDM scheme. Particularly, an embodiment of the present disclosure below will describe an example of an operation in which the BS groups beams and transmits reference signals based on such beam grouping when it is difficult to select beams, which do not give interference to different beam groups, from each beam group. The beam group, which is grouped according to the other embodiment of the present disclosure, may include the different number of beams unlike the beam group grouped according to the embodiment of the present disclosure.

Figure 5:
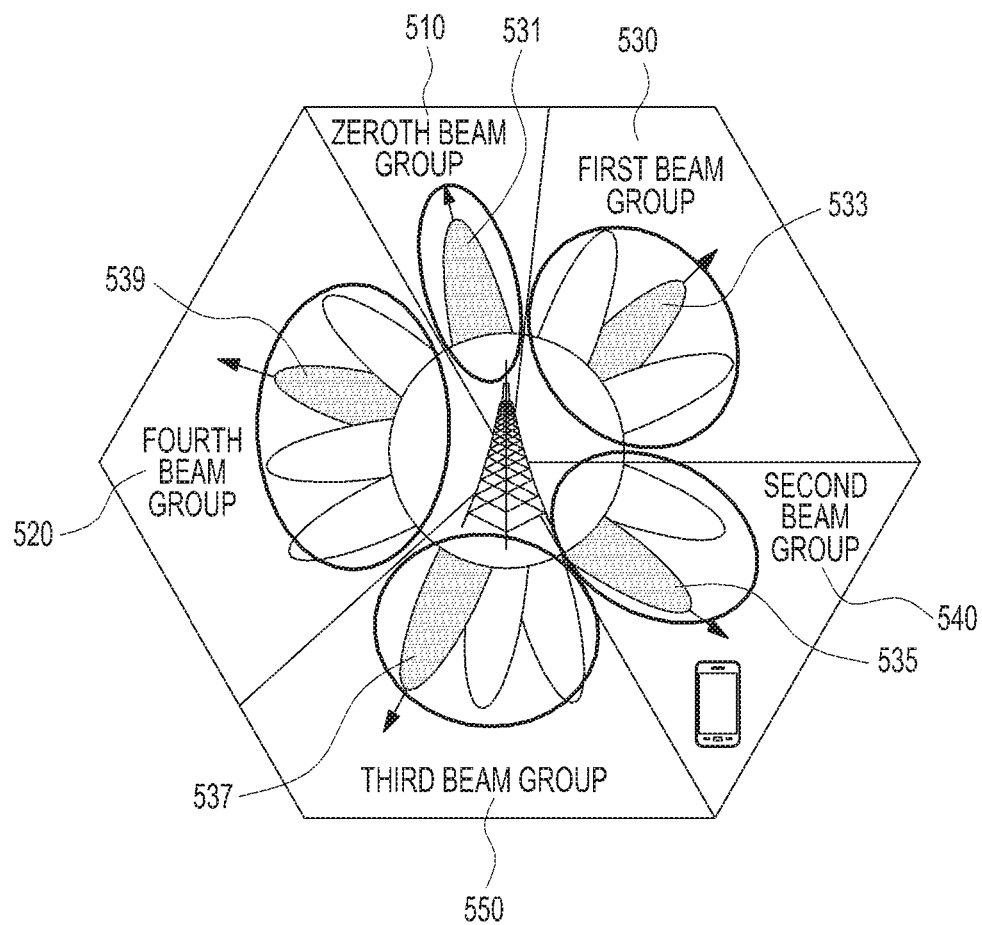
FIG. 5 illustrates an example of beam grouping according to an embodiment of the present disclosure.

FIG. 5 illustrates an example of beam grouping according to an embodiment of the present disclosure.

Referring to FIG. 5, a scenario of deploying one cell in one site is assumed. The BS configures a plurality of beam groups, for example, a zeroth beam group 510 to a fourth beam group 520 with respect to a plurality of beams supported by the cell. The zeroth beam group 510 includes one beam, a first beam group 530 and a third beam group 550 include three beams, a second beam group 540 includes two beams, and the fourth beam group 520 includes four beams.

Further, the BS configures the beam groups such that one beam included in a particular beam group does not generate interference with at least one beam within the remaining other beam groups. That is, in respective beam groups, beams corresponding to reference numerals 531, 533, 535, 537, and 539 do not generate interference therebetween.

Accordingly, the BS selects the beams 531, 533, 535, 537, and 539, which do not generate interference, from the beam groups, respectively, and simultaneously transmits reference signals by using the selected beams. At this time, the BS separates the reference signals through the SDM scheme. The reason why the reference signals may be separated through the SDM scheme is that the beams 531, 533, 535, 537, and 539 included in the beam groups do not generate interference therebetween as described above.

However, when measuring a channel state and reporting the channel state to the BS, the UE preferably identifies a beam group including the corresponding beam. Accordingly, the BS performs scrambling of multiplying the RS and the sequence based on the beam group ID and transmits the scrambled RS to the UE. According to another example, the BS may interleave or mask the reference signals and then transmit the interleaved or masked reference signals.

Figure 6:
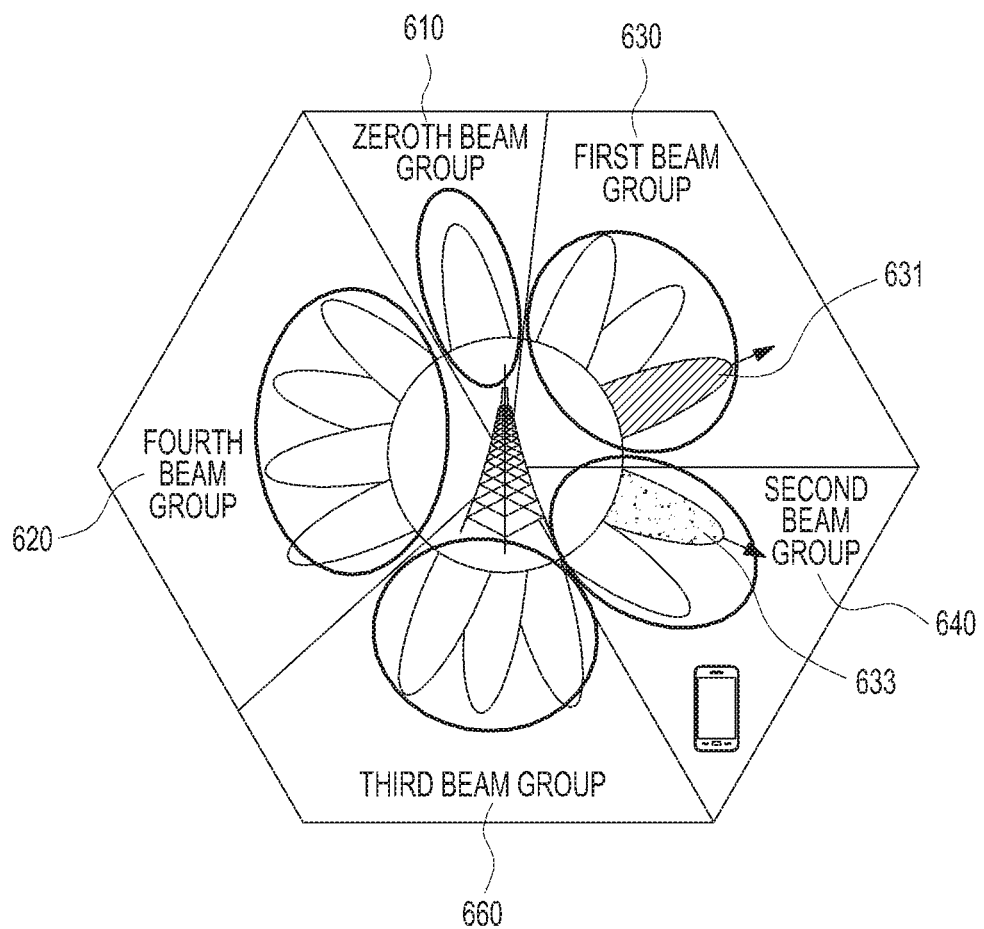
FIG. 6 illustrates another example of the beam grouping according to an embodiment of the present disclosure.

FIG. 6 illustrates an example of beam grouping according to an embodiment of the present disclosure.

Referring to FIG. 6, a scenario of deploying one cell in one site is assumed. The BS configures a plurality of beam groups, for example, a zeroth beam group 610 to a fourth beam group 620 with respect to a plurality of beams supported by the cell. The zeroth beam group 610 includes one beam, a first beam group 630 and a third beam group 660 include three beams, the second beam group 640 includes two beams, and the fourth beam group 620 includes four beams.

Further, the BS configures the beam groups such that one beam included in a particular beam group does not generate interference with at least one beam within the remaining other beam groups. However, when the beams, which do not generate interference therebetween within each group, are all used for RS transmission, the remaining beams are used to transmit reference signals to be separated through one of the TDM scheme, FDM scheme, and CDM scheme. At this time, the beams used for transmitting the reference signals may be selected from the same beam group or different beam groups.

Figure 7:
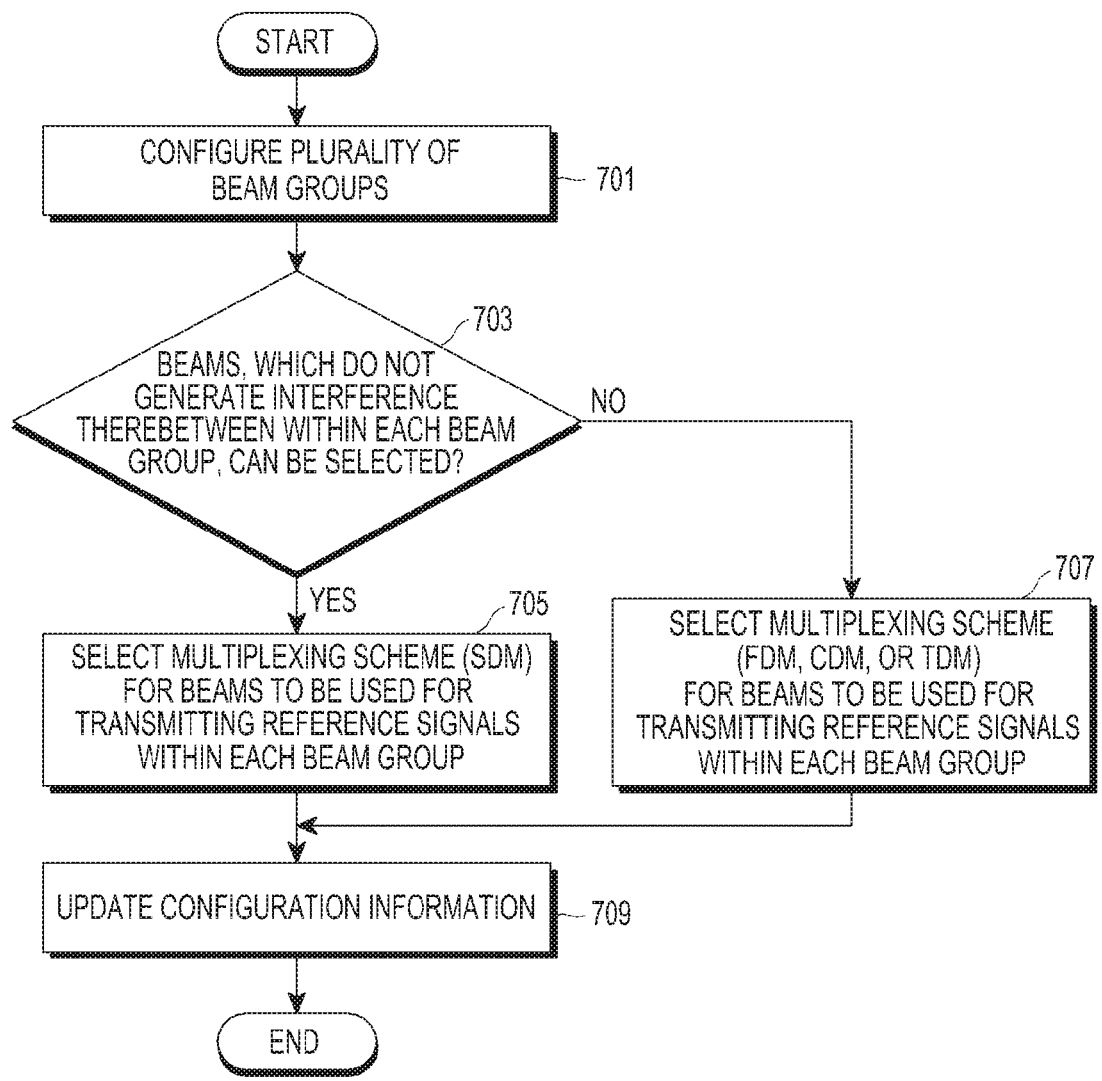
FIG. 7 is a flowchart illustrating an example of an operation in which a BS updates configuration information based on beam grouping according to an embodiment of the present disclosure.

FIG. 7 is a flowchart illustrating an example of an operation in which the BS updates configuration information based on beam grouping according to an embodiment of the present disclosure.

Referring to FIG. 7, compared to the configuration information on the reference signals broadcasted by the BS in an embodiment of the present disclosure, the configuration information on the reference signals broadcasted by the BS in an embodiment of the present disclosure may additionally include information related to a beam group ID, a beam ID, and the number of transmission beams included in each beam group, information related to a scrambling scheme, an interleaving scheme, or a masking scheme applied to the reference signals, and information related to a multiplexing scheme (i.e., SDM scheme, FDM scheme, CDM scheme, or TDM scheme) for beams to be used for transmitting the reference signals in each beam group.

That is, the configuration information on the RS broadcasted by the BS in an embodiment of the present disclosure includes at least one piece of information related to the number of antennas included in the antenna array, information related to the number of transmission beams included in the beam group, information related to the number of beam groups set in one cell, and information related to a time, frequency, or code resource location used for transmission of the reference signal.

Further, the configuration information on the RS broadcasted by the BS in an embodiment of the present disclosure includes at least one piece of information related to the number of antennas included in an antenna array, information related to the number of transmission beams included in a beam group, information related to the number of beam groups set in one cell, information related to a location of time, frequency, or code resources used for transmitting the reference signals, information related to a beam group identifier, a beam identifier, and the number of transmission beams included in each beam group, information related to a scrambling scheme, an interleaving scheme, or a masking scheme applied to the reference signals, and information related to a multiplexing scheme (i.e., SDM scheme, FDM scheme, CDM scheme, or TDM scheme) for beams to be used for transmitting the reference signals in each beam group.

In operation 701, the BS configures a plurality of beam groups with respect to beams supported by the cell. In operation 703, the BS identifies whether beams, which do not generate interference therebetween, may be selected from beam groups.

When the beams, which do not generate interference therebetween, may be selected from the beam groups based on a result of the identification, the BS selects a multiplexing scheme, that is, an SDM scheme for beams to be used for RS transmission in the beam groups in operation 705. The BS having selected the SDM scheme updates the multiplexing scheme included in the configuration information to be the SDM scheme in operation 709.

When the beams, which do not generate interference therebetween, cannot be selected from the beam groups based on a result of the identification, the BS selects a multiplexing scheme, that is, one of an FDM scheme, a CDM scheme, and a TDM scheme for beams to be used for RS transmission in the beam groups in operation 707. The BS having selected one of the FDM scheme, the CDM scheme, and the TDM scheme updates the multiplexing scheme included in the configuration information to be one scheme selected from the FDM scheme, the CDM scheme, and the TDM scheme in operation 709.

Figure 8A:
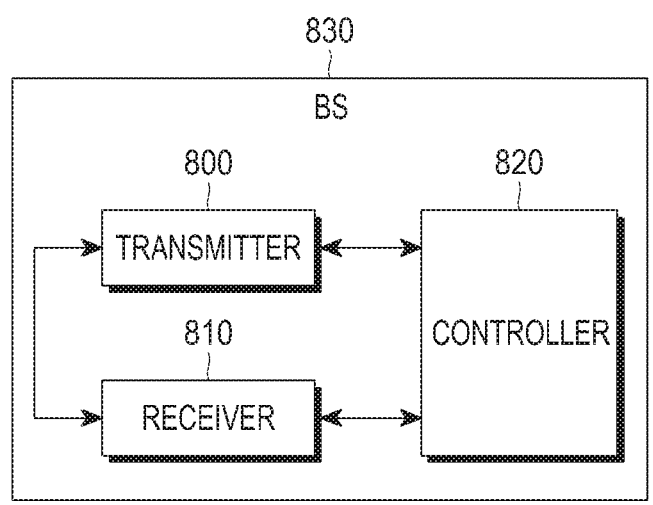
FIG. 8A illustrates a BS apparatus which transmits reference signals based on beam grouping according to an embodiment of the present disclosure.

FIG. 8A illustrates a BS apparatus which transmits reference signals based on beam grouping according to an embodiment of the present disclosure.

Referring to FIG. 8A, a BS 830 includes a transmitter 800, a receiver 810, and a controller 820.

The transmitter 800 broadcasts configuration information on the reference signals to UEs and broadcasts the reference signals according to the configuration information. At this time, the configuration information is transmitted through a signal which transfers system information such as an SIB or an MIB. The configuration information includes at least one piece of information on the number of antennas included in the antenna array, the number of transmission beams included in the beam group, the number of beam groups set in one cell, a time used for RS transmission, and locations of frequency or code resources. A transmission period of the configuration information may be longer than a transmission period of the reference signal.

Further, the RS is transmitted through a pre-appointed scheme according to a predetermined condition and, particularly, the RS is scrambled based on a beam group ID and then transmitted. The number of sequences used for the scrambling may be determined according to the number of beam groups, and the RS may be transmitted through interleaving or masking according to cases.

The controller 820 identifies whether the BS makes a request for a report on a beam group ID and beam ID information to a particular UE among the UEs, to which the reference signals are broadcasted, or whether a request for the report on the beam group ID and beam ID information, which is most recently transmitted to the UE, is effective at a current time point and, when the BS makes the request for the report on the beam group ID and beam ID information or the request for the report on the beam group ID and beam ID information is effective at the current time point, receives feedback information from the UE through the receiver 810. The beam group ID and the beam ID information refer to a beam group ID and beam ID information with respect to a beam that meets a particular condition. The particular condition may be a condition that, for example, guarantees an optimal channel environment.

Further, when the BS has not made the request for the report on the beam group ID and beam ID information to the particular UE or the request for the report on the beam group ID and beam ID information is not effective at the current time point, the controller 820 broadcasts configuration information on the reference signals, broadcasts the reference signals according to the configuration information, or identifies whether the BS makes the request for the report on the beam group ID and beam ID information to the particular UE or the request for the report on the beam group ID and beam ID information is not effective at the current time point.

When making the request for the report on the beam group ID and beam ID information to the UE, the transmitter 800 may also transmit time information indicating an effective time of the request for the report and, in this case, when the receiver 810 receives feedback information from the UE, broadcasts the configuration information on the reference signals and the reference signals until the time information reaches an indicated time.

A detailed configuration of the transmitter 800 will be described through FIG. 8B.

Figure 8B:
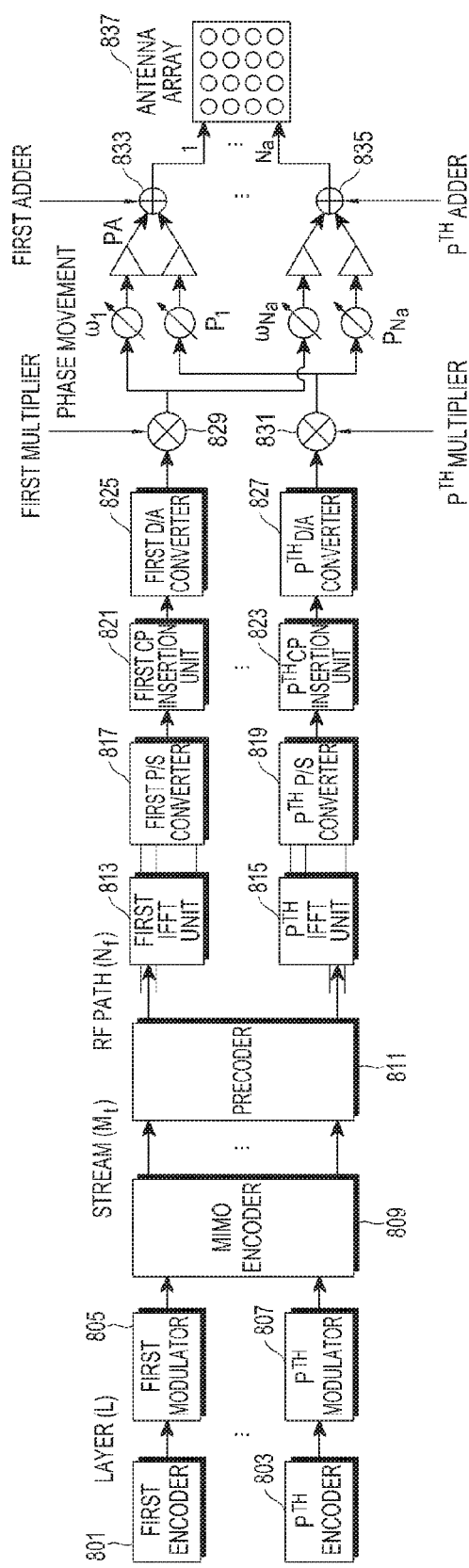
FIG. 8B illustrates an internal structure of a transmitter included in a BS apparatus which transmits reference signals based on beam grouping according to an embodiment of the present disclosure.

FIG. 8B illustrates an internal structure of a transmitter included in a BS apparatus which transmits reference signals based on beam grouping according to an embodiment of the present disclosure.

Referring to FIG. 8, the transmitter 800 of the BS includes a first encoder 801 to a $P^{th}$ encoder 803, a first modulator 805 to a $P^{th}$ modulator 807, a multi input multi output (MIMO) encoder 809, a precoder 811, a first inverse fast Fourier transform (IFFT) unit 813 to a $P^{th}$ IFFT unit 815, a first parallel to serial (P/S) converter 817 to a $P^{th}$ P/S converter 819, a first cyclic prefix (CP) insertion unit 821 to a $P^{th}$ CP insertion unit 823, a first digital to analog (D/A) converter 825 to a $P^{th}$ D/A converter 827, a first multiplier 829 to a $P^{th}$ multiplier 831, and a first adder 833 to a $P^{th}$ adder 835. The transmitter structure illustrated in FIG. 8B is only an example, and may be modified according to an implementation.

The first encoder 801 to the $P^{th}$ encoder 803 encode input bits and output the encoded bits to the first modulator 805 to the $P^{th}$ modulator 807. The first modulator 805 to the $P^{th}$ modulator 807 input and modulate the encoded bits and output the modulated symbols to the MIMO encoder 809. The MIMO encoder 809 inputs the modulated symbols to apply an orthogonal code such as an Alamouti scheme and outputs the symbols to which the orthogonal code is applied to the precoder 811.

The precoder 811 inputs the symbols to which the orthogonal code is applied to perform digital beamforming and outputs the signal having passed through the digital beamforming to the first IFFT unit 813 to the $P^{th}$ IFFT unit 815. When the digital beamforming is performed by an analog or radio frequency (RF) transmitter, a configuration of the precoder 811 may be omitted.

The first IFFT unit 813 to the $P^{th}$ IFFT unit 815 convert the signal having passed through the digital beamforming into time domain signals and output the time domain signals to the first P/S converter 817 to the $P^{th}$ P/S converter 819. The first P/S converter 817 to the $P^{th}$ P/S converter 819 input the time domain signals in the parallel form to convert the signals into signals in the serial form, and output the signals to the first CP insertion unit 821 to the $P^{th}$ CP insertion unit 823.

The first CP insertion unit 821 to the $P^{th}$ CP insertion unit 823 add the cyclic prefix to the input signals in the serial form, convert the signals into analog signals through the first D/A converter 825 to the $P^{th}$ D/A converter 827, and output the analog signals to the first multiplier 829 to the $P^{th}$ multiplier 831.

The first multiplier 829 to the $P^{th}$ multiplier 831 multiply the input signal by a weight by phase movement, and the signals multiplied by the weight pass through a power amplifier (PA) and the first adder 833 to the $P^{th}$ adder 835, and then are transmitted through an antenna array 837.

The aforementioned transmitter structure may support at least one beam group and the receiver performs an inverse process of the transmitter. Further, the transmitter structure may be variously modified according to an implementation. For example, the transmitter may include a plurality of antenna arrays and may be connected to a plurality of RF chains per antenna array.

Figure 9:
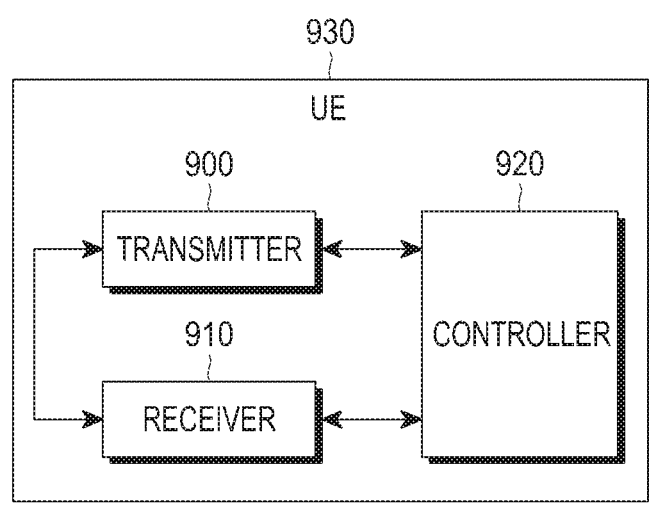
FIG. 9 illustrates a UE apparatus which receives a reference signal transmitted through grouping according to an embodiment of the present disclosure.

FIG. 9 illustrates a UE apparatus which receives an RS transmitted through grouping according to an embodiment of the present disclosure.

Referring to FIG. 9, a UE 930 includes a transmitter 900, a receiver 910, and a controller 920.

The receiver 910 receives configuration information on the RS through a signal transferring system information transmitted from the BS and receives the reference signal. The receiver 910 receives the configuration information only when the UE does not know the configuration information on the RS or receives information, which informs that the configuration information is changed, from the BS, and does not receive the configuration information when the UE knows the configuration information on the reference signal.

The controller 920 measures a beam group ID and a beam ID which meet a particular condition by using the RS received by the receiver 910. The particular condition may be a condition that, for example, guarantees an optimal channel environment. At this time, since the beam group ID, which guarantees the optimal channel environment, is preferably measured at the same time when the beam ID, which guarantees the optimal channel environment, is measured, the controller 920 basically performs descrambling on the scrambled RS based on all beam group IDs. Of course, when the RS is scrambled together with information such as a cell ID and a frame index, the descrambling is performed in consideration of the information on the cell ID and the frame index.

Further, the controller 920 identifies whether a request for a report on a beam group ID and beam ID information is received from the BS or whether a request for the report on the beam group ID and beam ID information, which is most recently received from the BS, is effective at a current time point and, when the request for the report on the beam group ID and beam ID information is received or the request for the report on the beam group ID and beam ID information is effective at the current time point, transmits feedback information through the transmitter 900. The feedback information refers to channel measurement information and may be, for example, the beam group ID and beam ID information with respect to the beam, which guarantees the optimal channel environment.

However, when the request for the report on the beam group ID and beam ID information has not been received or the request for the report on the beam group ID and beam ID information, which is most recently received from the BS, is not effective at the current time point, based on a result of the identification, the controller 920 receives configuration information on the RS and the RS from the BS through the receiver 910.

The request for the report on the beam group ID and beam ID information transmitted from the BS may be transmitted together with time information indicating an effective time of the request for the report. In this case, when the transmitter 900 transmits feedback information to the BS, the receiver 910 receives the configuration information on the RS and the RS until the time information reaches an indicated time.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Further, a method and an apparatus for transmitting and receiving an RS through beam grouping according to an embodiment of the present disclosure may be implemented in the form of hardware, software, or a combination thereof. Any such software may be stored, for example, in a volatile or non-volatile storage device such as a read only memory (ROM), a memory such as a random access memory (RAM), a memory chip, a memory device, or a memory integrated circuit (IC), or a recordable optical or magnetic medium such as a compact disc (CD), a digital versatile disc (DVD), a magnetic disk, or a magnetic tape, regardless of its ability to be erased or its ability to be re-recorded. A web widget manufacturing method of the present disclosure may be realized by a computer or a portable terminal including a controller and a memory, and it may be seen that the memory corresponds to an example of the storage medium which is suitable for storing a program or programs including instructions by which the embodiments of the present disclosure are realized, and is machine readable.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

In addition, an apparatus for transmitting an RS through beam grouping according to an embodiment of the present disclosure may receive a program from a program providing apparatus connected to the apparatus wirelessly or through a wire and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of transmitting a reference signal in a wireless communication system by a base station (BS), the method comprising:
   transmitting configuration information on a reference signal to a user equipment (UE);
   performing a scrambling operation of multiplying the reference signal and a sequence, the sequence being based on a beam group identifier of each of two or more beam groups configured in one cell; and
   transmitting the reference signal having passed through the scrambling operation to the UE based on the configuration information.

2. The method of claim 1,
   wherein beams, which do not generate interference therebetween within the two or more beam groups, are used for transmitting the reference signals, and
   wherein the reference signals transmitted using the beams are multiplexed and transmitted through a space division multiplexing (SDM) scheme.

3. The method of claim 2, wherein the configuration information includes at least one piece of information related to a number of antennas included in an antenna array, information related to a number of beams included in a beam group, information related to a number of beam groups set in one cell, and information related to a location of time, frequency, or code resources used for transmitting the reference signals.

4. The method of claim 1, wherein a number of sequences used for the scrambling operation is determined by the number of beam groups set in the one cell.

5. The method of claim 1, wherein the scrambling operation is restrictively applied to a particular time/frequency resource, a particular antenna, or a particular beam.

6. The method of claim 1, when, beams, which do not generate interference therebetween within the two or more beam groups, are unselectable, reference signals transmitted in each of the two or more beam groups are multiplexed and transmitted through one of a frequency division multiplexing (FDM) scheme, a code division multiplexing (CDM) scheme, and a time division multiplexing (TDM) scheme.

7. The method of claim 6, wherein the configuration information includes at least one piece of information related to a number of antennas included in an antenna array, information related to a number of beams included in a beam group, information related to a number of beam groups set in the one cell, information related to a location of time, frequency, or code resources used for transmitting the reference signals, information related to the beam group identifier, a beam identifier, and a number of beams included in each beam group, information related to a scrambling scheme, an interleaving scheme, or a masking scheme applied to the reference signals, and information related to a multiplexing scheme for beams to be used for transmitting the reference signals in each beam group.

8. The method of claim 1, further comprising:
identifying whether beams, which do not generate interference therebetween within the two or more beam groups, are selectable; and
updating information related to a multiplexing scheme for beams to be used for transmitting the reference signals in each beam group based on a result of the identification.

9. A method of receiving a reference signal in a wireless communication system by a user equipment (UE), the method comprising:
receiving a reference signal having passed through a scrambling operation of multiplying a sequence, the sequence being based on a beam group identifier for each of two or more beam groups set in one cell from a base station (BS);
performing a descrambling operation on the reference signal;
measuring a beam group identifier and a beam identifier, which meet a particular condition, based on a result of the descrambling operation with respect to each of the two or more beam groups; and
transmitting information related to the beam group identifier and beam identifier.

10. The method of claim 9, wherein the transmitting of the information related to the beam group identifier and beam identifier comprises:
transmitting a reference beam identifier related to a reference beam selected from the measured beams with respect to each of the two or more beam groups and information on a beam group identifier related to a beam group including the reference beam; and
transmitting information related to a difference value between the reference beam identifier and an identifier related to another beam, which is not the reference beam, to the BS.

11. The method of claim 10,
wherein the reference beam identifier and the beam group identifier related to the beam group including the reference beam are transmitted based on a predetermined period, and
wherein the information related to the difference value is transmitted based on a period shorter than the predetermined period.

12. The method of claim 11, wherein a range of the difference value is determined as 1≤δ≤(number of beams included in a beam group).

13. The method of claim 9, wherein the beam group identifier is measured based on a period longer than a measurement period of the beam identifier or measured if a change in a signal strength for a currently preferred beam group is larger than a particular threshold.

14. A base station (BS) comprising:
a transmitter configured to transmit configuration information on a reference signal to a user equipment (UE); and
at least one processor configured to perform a scrambling operation of multiplying the reference signal and a sequence, the sequence being based on a beam group identifier of each of two or more beam groups configured in one cell,
wherein the transmitter is further configured to transmit the reference signal having passed through the scrambling operation to the UE based on the configuration information.

15. The BS of claim 14,
wherein beams, which do not generate interference therebetween within the two or more beam groups, are used for transmitting the reference signals, and
wherein the reference signals transmitted using the beams are multiplexed and transmitted through a space division multiplexing (SDM) scheme.

16. The BS of claim 15, wherein the configuration information includes at least one piece of information related to a number of antennas included in an antenna array, information related to a number of beams included in a beam group, information related to a number of beam groups set in one cell, and information related to a location of time, frequency, or code resources used for transmitting the reference signals.

17. The BS of claim 14, when, beams, which do not generate interference therebetween within the two or more beam groups, are unselectable, reference signals transmitted in each of the two or more beam groups are multiplexed and transmitted through one of a frequency division multiplexing (FDM) scheme, a code division multiplexing (CDM) scheme, and a time division multiplexing (TDM) scheme.

18. The BS of claim 17, wherein the configuration information includes at least one piece of information related to a number of antennas included in an antenna array, information related to a number of beams included in a beam group, information related to a number of beam groups set in the one cell, information related to a location of time, frequency, or code resources used for transmitting the reference signals, information related to the beam group identifier, a beam identifier, and a number of beams included in each beam group, information related to a scrambling scheme, an interleaving scheme, or a masking scheme applied to the reference signals, and information related to a multiplexing scheme for beams to be used for transmitting the reference signals in each beam group.

19. A user equipment (UE) comprising:
a receiver configured to receive a reference signal having passed through a scrambling operation of multiplying a sequence, the sequence being based on a beam group identifier for each of two or more beam groups set in one cell from a base station (BS);
at least one processor configured to:
perform a descrambling operation on the reference signal, and
measure a beam group identifier and a beam identifier, which meet a particular condition, based on a result of the descrambling with respect to each of the two or more beam groups; and a transmitter configured to transmit information related to the beam group identifier and beam identifier.

20. The UE of claim 19, wherein the transmitter is further configured to transmit a reference beam identifier related to a reference beam selected from the measured beams with respect to each of the two or more beam groups and information on a beam group identifier related to a beam group including the reference beam, and to transmit information related to a difference value between the reference beam identifier and an identifier related to another beam, which is not the reference beam, to the BS.

* * * * *